United States Patent Office 3,196,314
Patented July 20, 1965

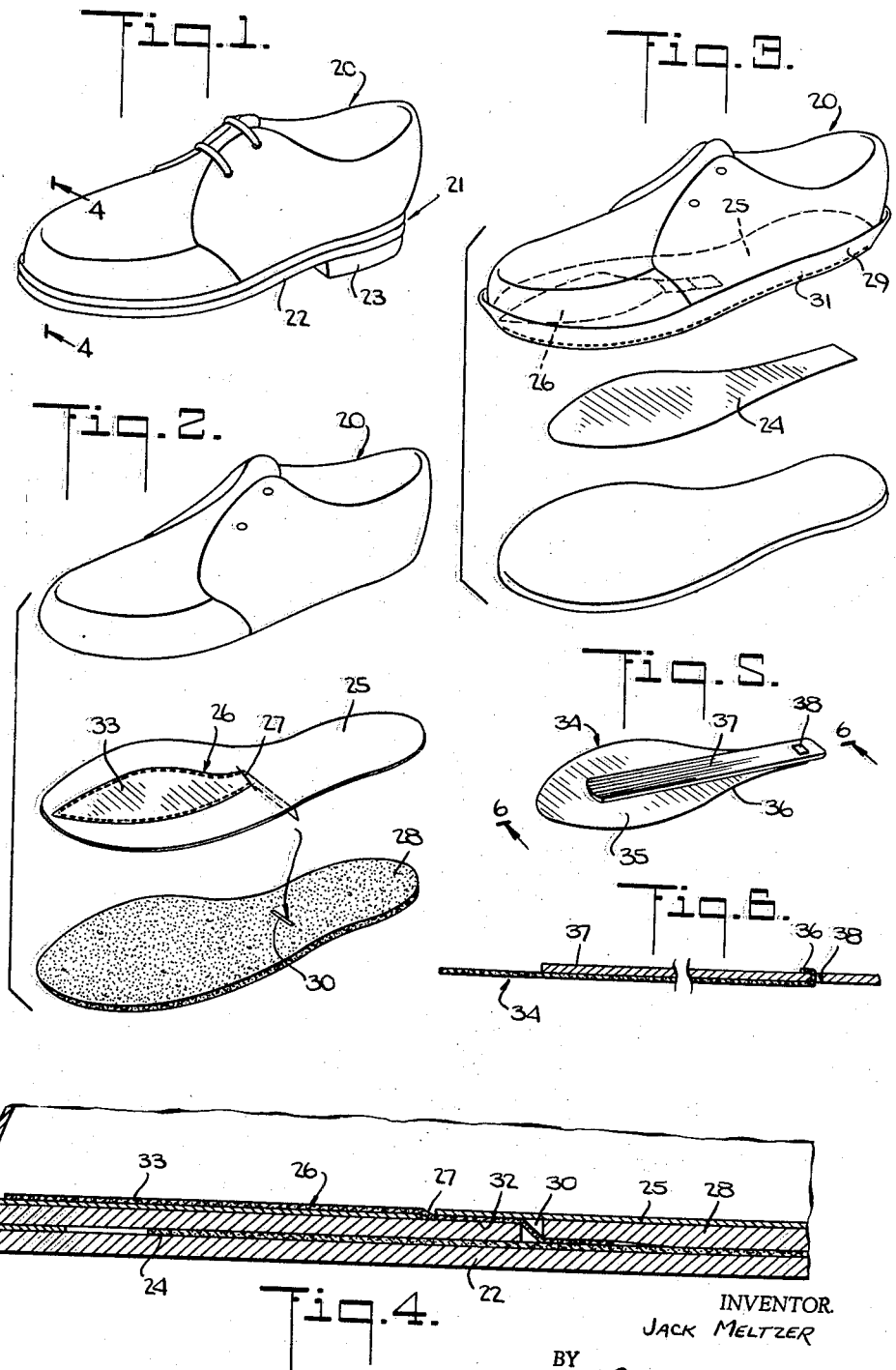

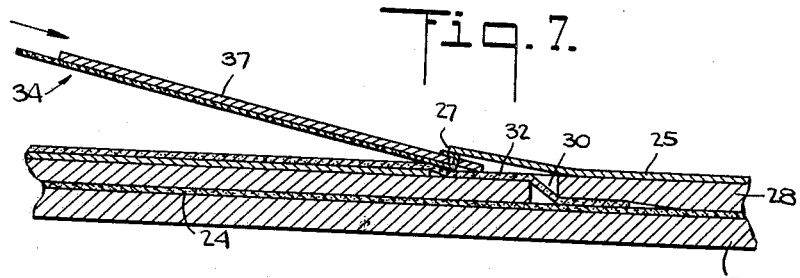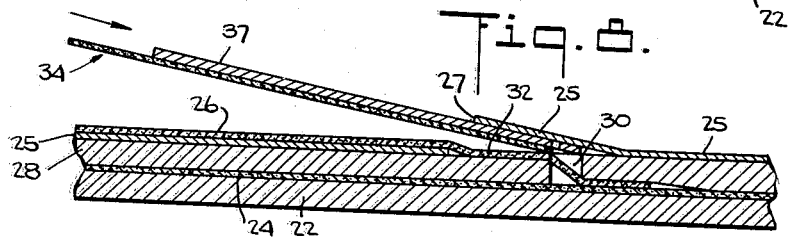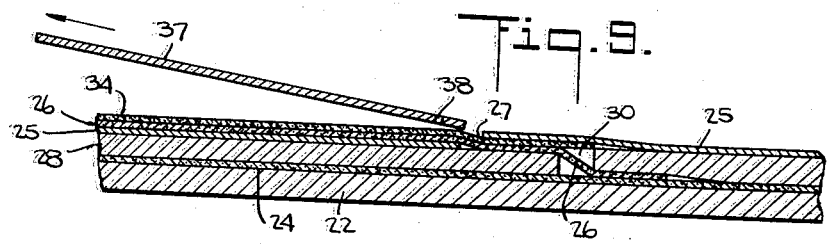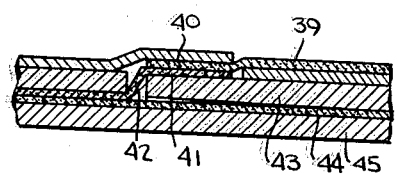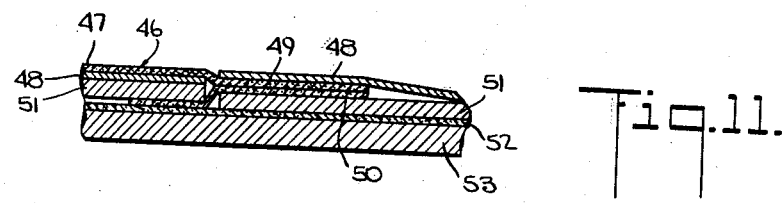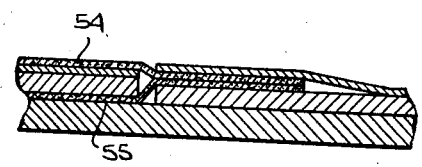

3,196,314
CONDUCTIVE SHOE AND METHOD OF REPAIR-
ING IT, AND REPAIR KIT THEREFOR
Jack Meltzer, 544 N. Laurel Ave., Hollywood 48, Calif.
Filed Aug. 8, 1962, Ser. No. 215,656
11 Claims. (Cl. 317—2)

This invention relates generally to footwear, and has particular reference to shoes known as conductive shoes, capable of establishing an electrical connection between the wearer and the ground, to prevent the build-up of potentially dangerous static charges.

It is a general object of the invention to provide structural improvements in conductive shoes of the type in which a conductive element includes a foot-engaging part exposed on the upper face of the socklining, and a nether part that extends downwardly into the sole structure through a slit in the socklining. In shoes of this kind, the replacement or repair of the foot-engaging part, when it becomes worn, has heretofore involved expensive and time-consuming procedures, and special skills with which ordinary shoe-repair establishments are not always familiar. A particular objective of this invention is to provide a sole structure which permits repairs of the character mentioned to be carried out far more expeditiously, at low cost, quickly, and without requiring any cumbersome or complex dismantling and reassembly of the sole structure. In fact, the improved shoe is so made, and the conductive element so incorporated with it, that even persons having no familiarity at all with shoemaking or shoe repairing procedures may make a replacement repair of the type referred to.

It is another object of the invention to provide an inexpensive and extremely simple "do-it-yourself" kit by means of which such repairs may be made.

A characterizing feature of the improved shoe resides in the fact that the nether part of the conductive element lies flatwise directly beneath, and in unattached relation to, the socklining. This permits a replacement repair to be effected by the simple provision of a suitably contoured conductive repair element having a body and a tail, by inserting the tail downwardly through the socklining slit into superposed contacting relation to the nether part of the original element, and by thereupon adhesively securing the body of the repair element to the socklining in overlying relation to the foot-engaging part of the original element.

The term "socklining" as used herein is intended to refer to the usual uppermost layer of material of which the sole structure is formed. Directly beneath it is a padding or similar layer which for the sake of simplicity is hereinafter referred to as a "midsole." The socklining may or may not be marginally wrapped around the midsole, depending on the shoe style; and an upper of any desired kind or styling can be secured to the sole structure. The sole structure is completed by a conductive outer sole with which the special conductive element having the foot-engaging part is electrically connected.

Another object of the invention is to provide a sole structure in which special conductive strip material is incorporated in such a way that an electrically conductive path of reliable nature is constantly effective, regardless of the posture or foot movements of the wearer of the shoe.

Another object of the invention is to provide a shoe having the advantageous features mentioned, and which also lends itself well to mass production on a commercial scale, economically, and in a wide variety of styles. Shoes constructed in accordance with the invention can have the comfort and appearance of conventional non-conductive shoes.

Several ways of achieving these objects, and such other benefits and advantages as may hereinafter appear or be pointed out, are shown by way of example in the accompanying drawings, in which—

FIGURE 1 is a perspective view of a shoe constructed in accordance with this invention;

FIGURE 2 is an exploded view of some of the parts that are assembled during the course of making the shoe of FIGURE 1;

FIGURE 3 is a similar view of a further stage of the manufacturing process;

FIGURE 4 is an enlarged cross-sectional view along the line 4—4 of FIGURE 1;

FIGURE 5 is a perspective view of a repair kit embodying the features of the invention;

FIGURE 6 is a cross-sectional view along the line 6—6 of FIGURE 5;

FIGURES 7, 8 and 9 are enlarged and exaggerated fragmentary cross-sectional views, in the same direction as FIGURE 4, showing successive stages of the repair procedure; and FIGURES 10, 11 and 12 are fragmentary cross-sectional views illustrating modifications.

All views are exaggerated with respect to the thickness of the elements involved, and their relationships to one another, for the sake of simplicity and clarity of illustration.

The shoe chosen for illustration in FIGURE 1 is a slip-lasted shoe having an upper 20, a wrapped midsole unit 21, and a conductive sole 22 having a separate heel 23. This shoe is merely an example of a large variety of possible styles, and the invention is not restricted to the particular article of footwear shown, nor to the slip-lasted method of manufacture now to be described.

In making the shoe of FIGURE 1, the upper 20 is first separately assembled (FIGURE 2), and a full-length socklining 25 is provided, having an appropriate corresponding contour. The socklining may be of any desired suitable material, such as fabric or leather, and in known fashion it is relatively thin and flexible.

Before the socklining 25 is assembled with the upper 20 it is associated with a conductive element of suitable flexible strip material 26. This strip may be composed of flexible flat material having the desired conductive property. Fabric that has been impregnated with carbonaceous or other conductive susbtance is an example.

The socklinging 25 is provided with a medial transverse slit 27, and the element 26 extends through it. The upper part 33 is relatively wide and is directed forwardly toward the front end of the socklining 25. It is shown stitched to the top face of the socklining but it may be adhesively or otherwise retained in position, if desired. This part of the conductive strip is a foot-engaging part in the finished shoe.

Separately provided is a midsole 28 which is somewhat thicker than the socklining 25 and is preferably composed of appropriate soft, comfortable, fibrous or composition material of the type usually employed for this purpose. The midsole 28 is provided with a transverse medial slit 30. In the shoe of FIGURES 1-4, the slit 30 is offset longitudinally (rearwardly) from the socklining slit 27.

The socklining 25 and the upper 20 are united by stitching 31 (FIGURE 3), and at the same time (or if desired in a separate operation) a wrapper strip 29 is secured to the upper. The wrapper is stitched to the outside, while the socklining is stitched to the inside, of the lower edge of the upper 20.

The rear narrower end of the strip 26 is then threaded through the slit 30 of the midsole 28, and the latter is adhesively applied to the underside of the socklining 25. This and subsequent procedures are carried out on a last. In known fashion, the wrapper 29 is brought around the edge of the midsole 28 to enclose its edges and to come into embracing relation thereto as shown in FIGURE 4. The wrapper 29 can be adhesively retained in this disposition.

It is at this stage that the conductive outer sole 22 is ready for application, but first a relatively large auxiliary conductive strip 24 is laid over the outer face of the midsole 28, in superposed contacting relation to the lower end of the conductive strip 26. The element 24 may be held in place by adhesive applied to its marginal region. The outer sole 22 is then adhesively applied, along with the heel 23. Conductive cement is preferably used so that a reliable electrically conductive contact is established between the parts 22 and 24. The outer sole is composed of conductive rubber or equivalent conductive material.

The finished shoe is neat and attractive in appearance, and comfortable to wear, and it does not necessarily reveal the fact that it is of the conductive variety. It looks like any conventional shoe and may embody any desired contour, style, color, or material. The conductive strip 26 can be concealed from casual view, or if desired that part of the strip which lies above the socklining can be deliberately exposed and specially contoured or imprinted for ornamental or trademarking or other purposes. In either case it provides a reliable and effective conductive path between the foot-contacting top face of the socklining and the conductive outer sole.

As best indicated in FIGURE 4, the offset relation between the slits 27 and 30 causes an intermediate part 32 of the conductive strip 26 to lie flat between the socklining 25 and the midsole 28. With respect to the upper foot-engaging part 33, which lies on the top face of the socklining, this intermediate part 32 is a nether part which lies directly beneath the socklining in unattached relation to the latter. This arrangement of parts makes it possible to effect a repair replacement of the foot-engaging part 33 (which tends to become worn and to lose some of its conductivity) in the manner depicted in FIGURES 5–9.

A repair element 34 is provided, composed of flexible conductive material which may be the same as, or similar to, the material of the original conductive element 26. It is shaped to define a body 35 and a tail 36, the body being preferably of relatively wide character, and the tail being narrow enough to pass through the socklining slit 27.

For use with the element 34 is a flat pusher 37, composed of inexpensive plastic or composition material. The pusher is relatively stiff but flexible enough to bend readily without breaking. It can have any suitable contour and in FIGURE 5 it is depicted as a relatively narrow strip of uniform width. The width at its rear end is no greater than that of the socklining slit 27 and it is provided at that end with an aperture or cut 38 (see FIGURE 9) through which the tail 36 of the repair element 34 may be threaded, as indicated in FIGURE 6.

With the elements 34 and 37 of the repair kit in the temporary interengagement of FIGURE 6, the rear end of the pusher is inserted into the slit 27 as shown in FIGURE 7. When the desired amount of the tail 36 has entered, the pusher 37 is advanced a bit further while the element 34 is held back, as a result of which the elements 34 and 37 separate from each other as shown in FIGURE 8.

Upon withdrawal of the pusher 37 (FIGURE 9) the tail 36 becomes frictionally clamped beneath the socklining 25 in superposed contacting relation to the nether or intermediate part 32 of the original element 26.

As a final step, the body 35 is adhesively applied over the original foot-engaging part 33. A replenished conductive part is thus brought into being, without having required any dismantling of the shoe or its sole structure. Obviously the repair procedure is one which calls for no special skill in the shoe-repairing art.

In the construction hereinbefore described, the slit 30 in the midsole lies rearwardly of the slit 27 in the socklining, and the lower end of the conductive element 26 turns rearward beneath the midsole. These relationships can be changed, if desired. For example, the lower part of the conductive strip could be turned forwardly. Similarly, the slits might be offset in the opposite direction as shown in FIGURE 10. Under these circumstances the foot-engaging part 39 might extend rearwardly and underlie the heel of the wearer's foot. The nether part 40 lies directly beneath and parallel to the socklining, and the application of a repair replacement would be performed as herein described except that the tail of the repair element would be directed forwardly to overlie the part 40 while the body would be applied over the original part 39.

The construction of FIGURE 10 is different, also, in that the conductive material that extends through the socklining and midsole is formed of two separate elements. The lower element 41 extends through the slit 42 in the midsole 43 and its upper part lies directly beneath and in contacting relation to the part 40. The lower part of the element 41 lies beneath the midsole and is covered by the relatively expansive auxiliary conductor 44 which in turn is covered by and establishes contact with the conductive outer sole 45. In the alternative, the conductor 44 may be eliminated, and the lower part of the element 41 may be made large enough to establish reliable electrically conductive contact with the outer sole 22.

When the slits in the socklining and midsole are offset, an added advantage is afforded during the manufacturing procedure. It may be desirable to apply graphite to the conductive strip on the underside of the midsole, to enhance its conductivity, and when pressure is applied to the parts to cement them together, some of the graphite may work its way upward to the inside of the shoe if the slits are aligned. This is avoided when the slits are out of alignment.

However, sometimes the slits in the socklining and midsole cannot conveniently be arranged in offset relation as in FIGURES 4 and 10. Under such circumstances the slits might be arranged closer together, or even in alignment as shown in FIGURES 11 and 12. In each case, however, the conductive foot-engaging part is connected to a nether part that lies flatwise directly beneath the socklining. Thus, in FIGURE 11, the conductive element 46 has a foot-engaging part 47 overlying the socklining 48 and a nether part 49 underlying it and unattached to it. The part 49 is connected at its end to a lower ply 50 that extends through the midsole 51 to a position underlying the latter. Here, as before, there is an auxiliary conductive element 52 and a conductive outer sole 53. The construction of FIGURE 12 is the same as that of FIGURE 11, except that the conductive strip material is formed of separate elements 54 and 55.

The ability to repair the structures of FIGURES 11 and 12 in the manner previously described will be obvious.

It will be understood that the procedural and structural details herein described may also be modified in numerous other respects without necessarily departing from the spirit and scope of the invention as expressed in the appended claims.

What is claimed is:

1. In a conductive shoe: a socklining having a transverse slit; a midsole having a transverse slit; conductive strip material extending through said slits and comprising a foot-engaging part above the socklining, an intermediate part between the socklining and midsole, and a lower part beneath the midsole; a conductive outer sole underlying and in electrical contact with said lower part; and said intermediate part lying flat between the socklining and midsole and being free of attachment to the socklining so that the foot-engaging part can be functionally replaced by an externally applicable conductive repair element overlying said foot-engaging part and having a tail adapted to extend through the socklining slit into superposed relation to said intermediate part.

2. A conductive shoe structure as defined in claim 1, in which the slits in the socklining and midsole are longitudinally offset from each other.

3. A conductive shoe structure as defined in claim 2, in which the slit in the midsole lies rearward of the socklining slit.

4. A conductive shoe structure as defined in claim 2, in which the slit in the midsole lies forward of the socklining slit.

5. A conductive shoe structure as defined in claim 1, in which said intermediate part consists of two plies in superposed contacting relation.

6. A conductive shoe structure as defined in claim 5, in which said intermediate part is a single strip doubled upon itself.

7. A conductive shoe structure as defined in claim 1, in which there is an auxiliary conductive underlay of appreciable size between the midsole and the outer sole, its upper face lying in contacting relation to the lower part of the conductive strip material.

8. A method of repairing a conductive shoe in which a socklining has a slit in it and a conductive element extends through said slit and has a foot-engaging part on the upper face of the socklining and a nether part lying flatwise directly beneath and free of attachment to the socklining, comprising furnishing a flat conductive repair element having a body and a tail, inserting said tail through said slit into superposed contacting relation to said nether part of the original conductive element, and thereafter adhesively securing said body to the socklining in overlying relation to the foot-engaging part of the original conductive element.

9. A method of repairing a conductive shoe comprising the steps defined in claim 8, said insertion of the tail being performed by temporarily securing the repair element to a flat pusher adapted to releasably engage said tail, then pushing the tail through said slit, then releasing it and withdrawing the pusher.

10. A repair kit for repairing a conductive shoe in which a socklining has a slit in it and a conductive element extends through said slit and has a foot-engaging part on the upper face of the socklining and a nether part lying flatwise directly beneath and free of attachment to the socklining, comprising a flat conductive repair element having a body and a tail, and a flat pusher having an end insertable into said slit and provided at said end with means for releasably engaging said tail.

11. A repair kit as defined in claim 10, in which said pusher is provided at said end with a transverse aperture through which said tail may be threaded, thereby effecting said releasable engagement.

References Cited by the Examiner

UNITED STATES PATENTS

| | | | |
|---|---|---|---|
| 2,279,094 | 4/42 | Siers | 317—2 |
| 2,857,556 | 10/58 | Price | 317—2 |
| 2,879,452 | 3/59 | Page | 317—2 |
| 3,079,530 | 2/63 | MacQuaid et al. | 317—2 |

SAMUEL BERNSTEIN, *Primary Examiner.*